United States Patent
Jiang (10) Patent No.: US 11,910,296 B2
(45) Date of Patent: Feb. 20, 2024

(54) METHOD AND APPARATUS FOR PROCESSING SI REQUEST, TERMINAL AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 17/287,902

(22) PCT Filed: Nov. 1, 2018

(86) PCT No.: PCT/CN2018/113533
§ 371 (c)(1),
(2) Date: Apr. 22, 2021

(87) PCT Pub. No.: WO2020/087471
PCT Pub. Date: May 7, 2020

(65) Prior Publication Data
US 2021/0400565 A1  Dec. 23, 2021

(51) Int. Cl.
*H04W 48/10* (2009.01)
*H04W 48/14* (2009.01)
*H04W 74/00* (2009.01)

(52) U.S. Cl.
CPC ........... *H04W 48/10* (2013.01); *H04W 48/14* (2013.01); *H04W 74/004* (2013.01); *H04W 74/006* (2013.01); *H04W 74/085* (2013.01)

(58) Field of Classification Search
CPC ... H04W 48/10; H04W 48/14; H04W 74/004; H04W 74/006; H04W 74/085; H04W 48/12; H04W 74/0833
See application file for complete search history.

(56) References Cited

U.S. PATENT DOCUMENTS

| 2018/0176962 A1* | 6/2018 | Wu | H04W 74/0833 |
| 2018/0270868 A1* | 9/2018 | Ou | H04W 74/004 |
| 2018/0279377 A1* | 9/2018 | Lin | H04W 74/0833 |

(Continued)

FOREIGN PATENT DOCUMENTS

| WO | WO 2018171795 A1 | 9/2017 | |
| WO | WO-2018121220 A1 * | 7/2018 | ............ H04W 24/00 |

OTHER PUBLICATIONS

3GPP TS 38.331 Radio Resource Control (RRC) Protocol specification version 15.3.0 (Oct. 2018) (Year: 2018).*

(Continued)

*Primary Examiner* — Ayaz R Sheikh
*Assistant Examiner* — David Zhijun Sun
(74) *Attorney, Agent, or Firm* — COZEN O'CONNOR (57) ABSTRACT

The present disclosure provides a method and an apparatus for processing a system information (SI) request. The method includes: sending an SI request to a base station in a current SI modification period, the SI request being configured to obtain at least one first SI corresponding to the SI request; determining, in the next SI modification period, whether a feedback message corresponding to the SI request returned by the base station is received; and if the feedback information is not received, stopping the SI request.

19 Claims, 6 Drawing Sheets

(56) References Cited

U.S. PATENT DOCUMENTS

2020/0107233 A1\* 4/2020 Agiwal ............. H04W 74/0808
2022/0361087 A1\* 11/2022 Kim ..................... H04W 48/14

OTHER PUBLICATIONS

3GPP R2-1700011 On Demand SI Delivery: Signaling Aspects, Spokane, USA, Jan. 17-19, 2017 (Year: 2017).\*
3GPP R2-1809844 Remaining issues of on-demand SI, Montreal, Canada, July. 2-Jul. 6, 2018 (Year: 2018).\*
PCT/CN2018/113533 English translation fo the International Search Report dated May 29, 2019, 2 pages.

\* cited by examiner

METHOD AND APPARATUS FOR PROCESSING SI REQUEST, TERMINAL AND STORAGE MEDIUM

This application is the US national phase application of International Application No. PCT/CN2018/113533, filed on Nov. 1, 2018, the entire content of which is incorporated herein by reference.

FIELD

The present disclosure relates to the field of wireless communication technology, and more particularly, to a method and a device for processing an System Information (SI) request, a terminal and a storage medium.

BACKGROUND

In a fifth-generation mobile communication technology (5G) system, a terminal in an idle state or in an inactive state communicates with the base station through System Information (SI). SI is divided into minimum SIs and other SIs. The minimum SIs include a master information block (MIB) and a System Information Block Type 1 (SIB1), and other SIs include SIB2, SIB3, etc. For the minimum SIs, the terminal does not need to send a request, the base station sends the MIB and SIB1 in the minimum Sis to the terminal by broadcasting. For other SIs, the current broadcast state of the SI is carried in SI scheduling information in SIB1, and the base station will separately indicate the current broadcast state of each SI other than SIB1 in the SI scheduling information in the SIB1. When the broadcast state of the SI indicates that the SI is not currently in the broadcast state, the terminal will send an SI request for obtaining the SI the base station.

In the related art, after receiving the SI request, the base station will send a confirmation message corresponding to the SI request to the terminal. After receiving the confirmation message, the terminal will receive the requested SI in the current SI modification period. When the confirmation message is not received in the current SI modification period, the terminal will continue to send the SI request to the base station in the next SI modification period.

Since the SI request is triggered based on the broadcast state of the SI in the previous SI modification period, the base station may have made a response after entering the next SI modification period. Therefore, the broadcast state of the SI is not valid any more in the next SI modification period, and the terminal continues to send the SI request to the base station. In this case, it is meaningless for the terminal to continue to send the SI request, which also causes a waste of network resources.

SUMMARY

According to a first aspect of the embodiments of the present disclosure, there is provided a method for processing an SI request, the method includes: sending an SI request to a base station in a current SI modification period, wherein the SI request is configured to obtain at least one first SI corresponding to the SI request; determining whether a feedback message corresponding to the SI request returned by the base station is received in a next SI modification period; stopping the SI request when no feedback message is received.

According to a second aspect of the embodiments of the present disclosure, a method for processing an SI request includes: sending an SI request to a base station in a current SI modification period, wherein the SI request is configured to obtain at least one first SI corresponding to the SI request; before entering a next SI, determining whether a second preset stopping condition is satisfied, wherein the second preset stopping condition includes that there is no SI window of the at least one first SI in the current SI modification period; when the second preset stopping condition is satisfied, stopping the SI request in the current SI modification period.

According to a third aspect of the embodiments of the present disclosure, a terminal includes: a processor; and a memory configured to store instructions executable by the processor, wherein, the processor is configured to: send an SI request to a base station in a current SI modification period, wherein the SI request is configured to obtain at least one first SI corresponding to the SI request; determine whether a feedback message corresponding to the SI request returned by the base station is received in a next SI modification period; stop the SI request when no feedback message is received.

According to a fourth aspect of the embodiments of the present disclosure, a terminal includes: a processor; and a memory configured to store instructions executable by the processor, wherein, the processor is configured to: send an SI request to a base station in a current SI modification period, wherein the SI request is configured to obtain at least one first SI corresponding to the SI request; before entering a next SI, determine whether a second preset stopping condition is satisfied, wherein the second preset stopping condition includes that there is no SI window of the at least one first SI in the current SI modification period; when the second preset stopping condition is satisfied, stop the SI request in the current SI modification period.

According to a fifth aspect of the embodiments of the present disclosure, there is provided a computer readable storage medium, having stored therein instructions that, when executed by a processor, to cause the processor to perform the method for processing the SI request in the first aspect of the embodiment of the present disclosure.

According to a sixth aspect of the embodiments of the present disclosure, there is provided a computer readable storage medium, having stored therein instructions that, when executed by a processor, to cause the processor to perform the method for processing the SI request in the second aspect of the embodiment of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

In order to make the objectives, technical solutions, and advantages of the present disclosure clearer, the embodiments of the present disclosure are described in detail with reference to the accompanying drawings.

The exemplary embodiments will be described in detail herein and shown in the accompanying drawings. When the following description refers to the drawings, unless otherwise indicated, the same reference number in different drawings indicates a same or similar element. The implementation described in the following exemplary embodiments do not represent all implementation consistent with the present disclosure. Rather, they are merely examples of devices and methods consistent with some aspects of the present disclosure as detailed in the appended claims.

Figure 1:
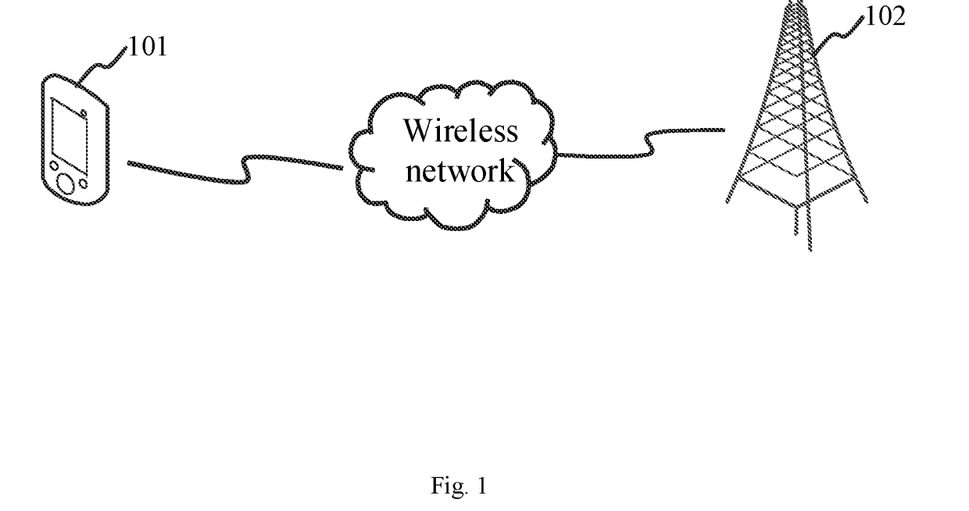
FIG. 1 is a schematic diagram of a system architecture related to a method for processing the SI request according to some exemplary embodiments of the present disclosure.

FIG. 1 is a schematic diagram of a system architecture related to a method for processing an SI request according to some exemplary embodiments of the present disclosure. The system architecture includes: a terminal 101 and a base station 102. The terminal 101 and the base station 102 may be connected through a wireless network. The system architecture is a 5G system architecture. The terminal 101 may be a handheld device (such as a mobile phone) with a wireless communication function, a vehicle-mounted device, a wearable device, a computing device, or other processing devices connected to a wireless modem, etc. In the embodiment of the present disclosure, the terminal 101 is no limited herein.

In a 5G system, the terminal 101 in an idle state or in an inactive state communicates with the base station 102 through SI. The SI includes a first SI and a second SI, where the first SI is other SI, and the second SI is the smallest SI. The second SI includes MIB and SIB1, and the first SI includes SIs other than the minimum SI, for example, includes SIB2, SIB3, and so on. For the second SI, the terminal 101 does not need to send a request, the base station 102 sends the MIB and SIB1 in the second SI to the terminal 101 by broadcasting; for the first SI, the SI content is carried in the SI scheduling information in SIB1, and the base station 102 will indicate the current broadcast state of each SI other than SIB1 in the SI scheduling information of SIB 1.

In the embodiment of the present disclosure, the terminal 101 sends an SI request to the base station 102 in the current SI modification period. In the next SI modification period, the terminal 101 determines whether the feedback message corresponding to the SI request returned by the base station 102 has been received, and when a feedback message is received when entering the next SI modification period, the SI request is stopped.

Before the terminal 101 communicates with the base station 102, the terminal 101 needs to initiate a random access procedure to the base station 102. The terminal 101 can initiate a random access procedure to the base station 102 in two methods. For the first method, the steps for the terminal 101 to initiate a random access procedure to the base station 102 are as follows. The terminal 101 sends MSG1 (MESSAGE1, the first random access message) to the base station 102, and MSG1 is configured to send a preamble. When the base station 102 receives the MSG1 sent by the terminal 101, the base station 102 sends MSG2 (MESSAGE2, the second random access message) to the terminal 101. The MSG2 is configured to indicate that the base station 102 has received the MSG1. The SI request may be carried in the MSG1, which is reflected by the preamble of the SI request specially reserved in the MSG1 and/or the time-frequency position for sending the preamble.

For the second method, the steps for the terminal 101 to initiate a random access procedure to the base station 102 are as follows. The terminal 101 sends MSG1 to the base station 102; when the base station 102 receives MSG1 sent by the terminal 101, the base station 102 sends MSG2 to the terminal 101; the terminal 101 receives MSG2 sent by the base station 102, and sends MSG3 (MESSAGE3, the third random access message) to the base station 102. The SI request is carried in MSG3, and MSG3 will carry the SI request of one RRC.

It should be noted that the SI request may be carried in a separate message sent by the terminal 101 to the base station 102, or in MSG1 or MSG3 sent by the terminal 101 to the base station 102.

Another point that needs to be explained is that the terminal 101 in the idle or inactive state can send the SI request to the base station 102, and the terminal 101 in the connected state can also send the SI request to the base station 102. In the embodiment of the present disclosure, a state of a terminal when the terminal sends the SI request to the base station 102 is not specifically limited.

Figure 2:
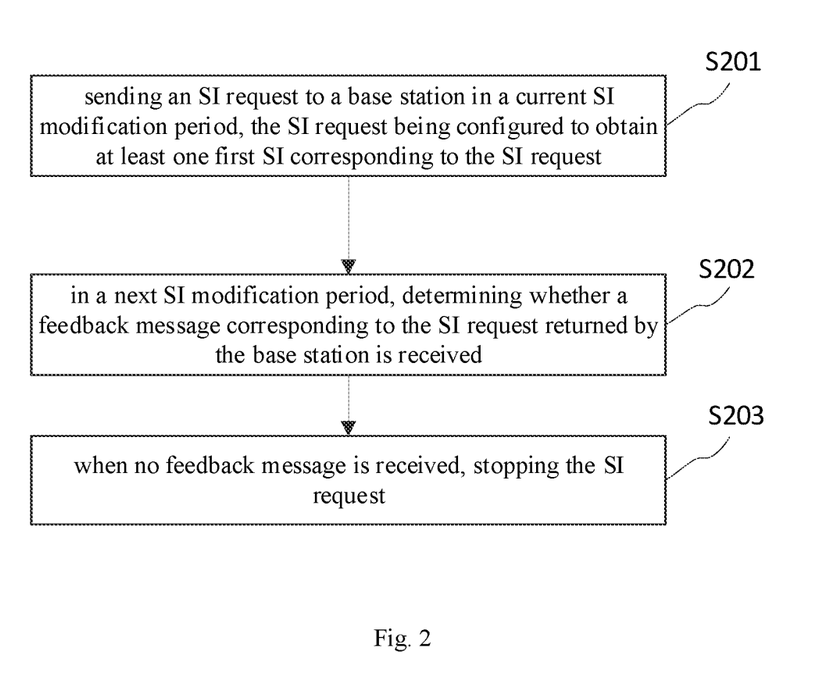
FIG. 2 is a flow chart showing a method for processing the SI request according to an exemplary embodiment.

FIG. 2 is a flowchart showing a method for processing an SI request according to an exemplary embodiment. As shown in FIG. 2, the method for processing SI requests may include the following steps.

In step S201, an SI request is sent to a base station in a current SI modification period, in which the SI request is configured to obtain at least one first SI corresponding to the SI request.

In step S202, in a next SI modification period, it is determined whether a feedback message corresponding to the SI request returned by the base station is received.

In step S203, when no feedback message is received, the SI request is stopped.

In a possible implementation, after the SI request is sent to the base station in the current SI modification period, before entering the next SI modification period, the method further includes: determining whether there is an SI window of the at least one first SI in the current SI modification period; when there is no SI window of the at least one first SI in the current SI modification period, stopping the SI request in the current SI modification period; when there is the SI window of the at least one first SI in the current SI modification period, determining whether a feedback message corresponding to the SI request returned by the base station is received in the next SI modification period.

In another possible implementation, before stopping the SI request, the method further includes: obtaining a first broadcast state of the at least one first SI in the second SI received in the next SI modification period; determining whether the first preset stopping condition is satisfied according to the first broadcast state of the at least one first SI, where the first preset stopping condition is a condition for stopping the SI request; when the first preset stopping condition is satisfied, stopping the SI request.

In another possible implementation, the determining whether the first preset stopping condition is satisfied according to the first broadcast state of the at least one first SI includes: determining whether each first SI corresponding to the SI request is in the broadcast state according to the first broadcast state of the at least one first SI; when each first SI corresponding to the SI request is in a broadcast state, determining that the first preset stopping condition is satisfied.

In another possible implementation, the determining whether the first preset stopping condition is satisfied according to the first broadcast state of the at least one first SI includes: determining whether there is a first SI in the broadcast state among the SIs corresponding to the SI request according to the first broadcast state of the at least one first SI; when there is a first SI in the broadcast state among the at least one first SI, determining that the first preset stopping condition is satisfied.

In another possible implementation manner, the method further includes: when the first preset stopping condition is satisfied, determining the first SI in the broadcast state based on the first broadcast state of the at least one first SI; receiving the first SI in the broadcast state returned by the base station in the SI window corresponding to the first SI in the broadcast state.

In another possible implementation, after stopping the SI request, the method further includes: obtaining a second broadcast state of the at least one first SI in the second SI received in the next SI modification period; determining whether there is a first SI that is not in the broadcast state in the at least one first SI in the next SI modification period according to the second broadcast state of the at least one first SI; when there is a first SI that is not in the broadcast state, initiating a new SI request.

In another possible implementation, before stopping the SI request, the method further includes: detecting whether the SI request is carried in the first message MSG1 in the random access procedure; when the SI request is carried in the MSG1, stopping the SI request.

In another possible implementation, before stopping the SI request, the method further includes: detecting whether the SI request is carried in the third message MSG3 in the random access procedure; when the SI request is carried in the MSG3, stopping the SI request.

In the embodiment of the present disclosure, before entering the next SI modification period, the terminal detects that there is no SI window in the current SI modification period, and the SI request is stopped in the current SI modification period, and the SI request is stopped in time, which avoids repeatedly sending SI requests that have been sent, and saves network resources.

Figure 3:
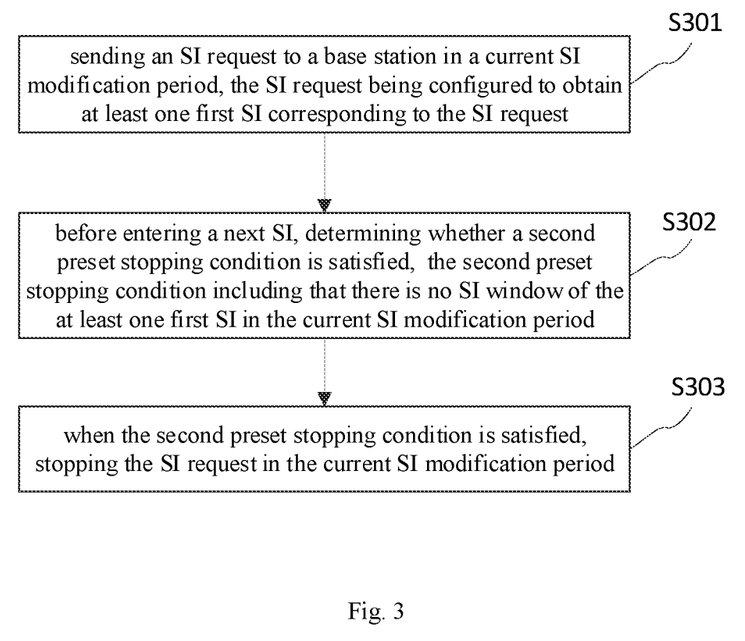
FIG. 3 is another flow chart showing a method for processing the SI request according to an exemplary embodiment.

FIG. 3 is a flowchart showing a method for processing an SI request according to an exemplary embodiment. As shown in FIG. 3, the method for processing SI requests may include the following steps.

In step S301, an SI request is sent to a base station in a current SI modification period, in which the SI request is configured to obtain at least one first SI corresponding to the SI request.

In step S302, before entering a next SI, it is determined whether a second preset stopping condition is satisfied, and the second preset stopping condition includes that there is no SI window of the at least one first SI in the current SI modification period.

In step S303, when the second preset stopping condition is satisfied, the SI request is stopped in the current SI modification period.

In another possible implementation, the second preset stopping condition further includes that a feedback message corresponding to the SI request returned by the base station is not received in the current SI modification period.

In the embodiment of the present disclosure, after the terminal sends the SI request to the base station in the current SI modification period, the terminal can determine whether to stop the SI request according to whether there is an SI window of the first SI corresponding to the SI request in the current SI modification period. When there is no SI window of the first SI corresponding to the SI request in the current period, the terminal no longer requests the first SI in the current SI modification period, which saves network resources.

Figure 4:
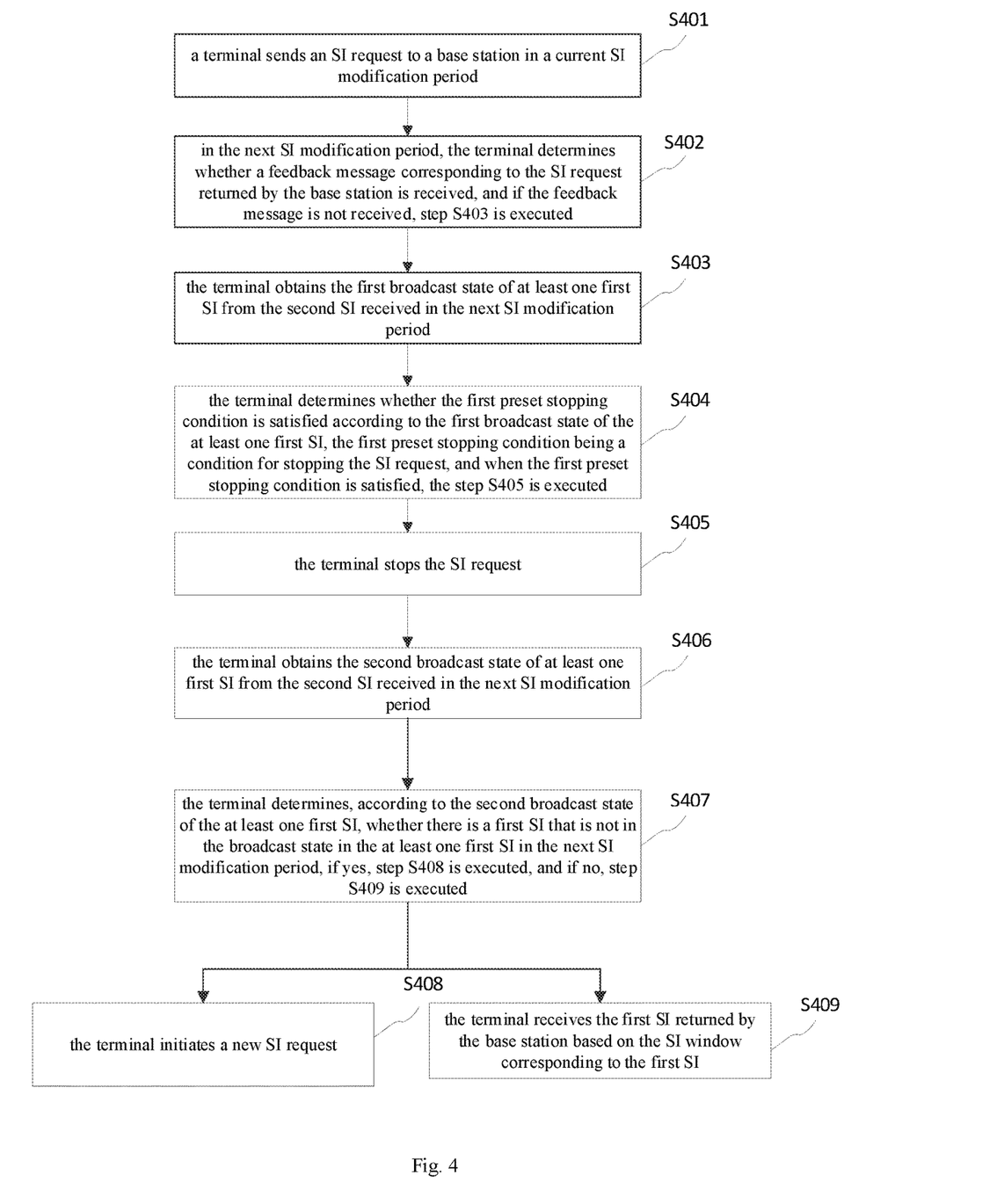
FIG. 4 is yet another flow chart showing a method for processing the SI request according to an exemplary embodiment.

FIG. 4 is a flow chart showing a method for processing an SI request according to an exemplary embodiment. In the embodiment of the present disclosure, after the terminal sends an SI request to the base station in the current SI modification period, when the terminal does not receive the feedback message of the SI request when entering the next SI modification period, the SI request is stopped as an example. As shown in FIG. 4, the method for processing SI requests may include the following steps.

In step S401, a terminal sends an SI request to a base station in a current SI modification period.

When the terminal needs to request an SI, the terminal sends an SI request to the base station in the current SI modification period; the SI request is configured to obtain at least one first SI corresponding to the SI request; the first SI is other SI that the terminal expects to obtain in the current SI modification period. The SI request may be carried in a single message sent by the terminal to the base station, or in MSG1 or MSG3 sent by the terminal to the base station, which is not limited in this embodiment.

In step S402, in the next SI modification period, the terminal determines whether a feedback message corresponding to the SI request returned by the base station is received, and if the feedback message is not received, step S403 is executed.

The feedback message includes a request confirmation message or a request failure message. The base station receives the SI request sent by the terminal, and when the base station sends at least one first SI corresponding to the SI request based on the SI request, the base station sends the request confirmation message to the terminal. When the base station cannot send at least one first SI corresponding to the SI request based on the SI request, the base station sends the request failure message to the terminal.

When the terminal receives the feedback message returned by the base station in the current SI modification period and the feedback message is the request confirmation message, the terminal receives the first SI in the SI window corresponding to the first SI. When the terminal receives the feedback message returned by the base station in the current SI modification period, and the feedback message is the request failure message, the terminal re-initiates an SI request to the base station in the current SI modification period.

When the terminal has not received the feedback message returned by the base station in the current SI modification period, the terminal continues to monitor until the next SI modification period is entered. In the next SI modification period, the terminal determines whether the feedback message corresponding to the SI request returned by the base station is received; when the terminal has not received the feedback message when entering the next SI modification period, step S403 is executed.

When the terminal has received the feedback message from the base station when entering the next SI modification period and the feedback message is a request confirmation message, the terminal receives the first SI in the SI window corresponding to the first SI. When the terminal has received a feedback message from the base station when entering the next SI modification period and the feedback message is a request failure message, the terminal re-initiates an SI request to the base station in the next SI modification period.

It should be noted that when no feedback message has been received when entering the next SI modification period, the step of stopping the SI request by the terminal in step S405 can be directly executed, or the first broadcast state of at least one first SI can be obtained by the following step S403, it is determined whether the first preset stopping condition is satisfied according to the first broadcast state, and when the first preset stopping condition is satisfied, step S405 is executed.

In step S403, the terminal obtains the first broadcast state of at least one first SI from the second SI received in the next SI modification period.

The second SI is the minimum SI in the next SI modification period; the scheduling information of the second SI includes the first broadcast state of at least one first SI. The terminal obtains the first broadcast state of at least one first SI from the scheduling information of the second SI. For example, the second SI may be SIB1, and the terminal obtains the first broadcast state of at least one first SI from the scheduling information of SIB1.

In step S404, the terminal determines whether the first preset stopping condition is satisfied according to the first broadcast state of the at least one first SI. The first preset stopping condition is a condition for stopping the SI request. When the first preset stopping condition is satisfied, the step S405 is executed.

The first preset stopping condition may be that each requested first SI is in the broadcast state, or that there is an SI in the broadcast state in the at least one requested first SI. In a possible implementation, when the first preset stopping condition is to request that each first SI is in the broadcast state, this step can be implemented through the following steps (1)-(2).

(1): According to the first broadcast state of at least one first SI, the terminal determines whether each first SI corresponding to the SI request is in the broadcast state.

The terminal determines whether each first SI corresponding to the SI request is in the broadcast state in the next SI modification period according to the first broadcast state of the at least one first SI.

(2): When each first SI corresponding to the SI request is in a broadcast state, it is determined that the first preset stopping condition is satisfied.

In another possible implementation, when the first preset stopping condition is that there is an SI in the broadcast state among the requested at least one first SI, this step can be executed through the following steps (A)-(B).

(A): The terminal determines whether there is a first SI in the broadcast state among the at least one first SI corresponding to the SI request according to the first broadcast state of the at least one first SI.

(B): When there is a first SI in a broadcast state among at least one first SI, the terminal determines that the first preset stopping condition is satisfied.

It should be noted that when the terminal determines that the first preset stopping condition is satisfied, step S405 is executed; when the terminal determines that the first preset stopping condition is not satisfied, the SI request process is continued.

It should be noted that when the first preset stopping condition is to request each first SI to be in the broadcast state, when the terminal determines that the first preset stopping condition is not satisfied, the terminal obtains the first SI in the broadcast state according to the first broadcast state of at least one first SI, and stop the SI request corresponding to the first SI in the broadcast state.

In step S405, the terminal stops the SI request.

In the first implementation, the terminal may stop the SI request when it determines that the first preset stopping condition is satisfied.

In the second implementation, the step of stopping the SI request is executed only when the SI request is carried in the MSG1 based on the random access procedure. Correspondingly, before the terminal stops the SI request, the terminal detects whether the SI request is carried in the MSG1 based on the random access procedure. When the SI request is carried in the MSG1, the step of stopping the SI request is executed. When the SI request is not carried in the MSG1, the step of stopping the SI request is not executed.

In the third implementation, the step of stopping the SI request is executed only when the SI request is carried in the MSG3 based on the random access procedure. Correspondingly, before the terminal stops the SI request, the terminal detects whether the SI request is carried in MSG3 based on the random access procedure. When the SI request is carried in the MSG3 based on the random access procedure, the step of stopping the SI request is executed. When the SI request is not carried in the MSG3 based on the random access procedure, the step of stopping the SI request is not executed.

It should be noted that after step S405 is executed, the terminal may not execute steps S406-S409. It is also possible for the terminal to continue to execute steps S406-S409 after executing step S405. Alternatively, after executing step S405, when there is a first SI in the broadcast state among the at least one first SI, the terminal may directly execute step S409.

In step S406, the terminal obtains the second broadcast state of at least one first SI from the second SI received in the next SI modification period.

The terminal obtains the second broadcast state of the at least one first SI from the scheduling information of the second SI, and then executes step S407.

In step S407, the terminal determines, according to the second broadcast state of the at least one first SI, whether there is a first SI that is not in the broadcast state in the at least one first SI in the next SI modification period. If yes, step S408 is executed, and if no, step S409 is executed.

In a possible implementation, the terminal can determine whether the at least one first SI corresponding to the SI request is not in the broadcast state in the next SI modification period through the second broadcast state of the at least one first SI. When at least one first SI corresponding to the SI request is not in the broadcast state in the next SI modification period, the terminal executes the step of initiating a new SI request in step S408. In another possible implementation, the terminal may determine whether there is a first SI that is not in the broadcast state in the at least one first SI in the next SI modification period through the second broadcast state of the at least one first SI, when there is a first SI that is not in the broadcast state in at least one first SI in the next SI modification period, the terminal executes the step of initiating a new SI request in step S408.

In step S408, the terminal initiates a new SI request.

In this step, when the first SI is not in the broadcast state in the next SI modification period, the terminal may initiate SI requests for all the first SIs corresponding to the SI requests, or it may only initiate the SI request of the first SI that is not in the broadcast state.

In step S409: the terminal receives the first SI returned by the base station based on the SI window corresponding to the first SI.

In step S405, when the terminal determines that the first preset stopping condition is satisfied, the terminal determines the first SI in the broadcast state based on the first broadcast state of the at least one first SI; the first SI in the broadcast state returned by the base station is received in the SI window corresponding to the first SI in the broadcast state.

In the embodiment of the present disclosure, when the terminal enters the next SI modification period, it is determined whether the feedback message corresponding to the SI request returned by the base station is received. When the feedback message is not received, the first broadcast state of the first SI can be received in the next SI modification period, and it is determined whether to stop the SI request according to the first broadcast state, which avoids repeated sending of the SI request that has been fed back, and saves network resources.

Figure 5:
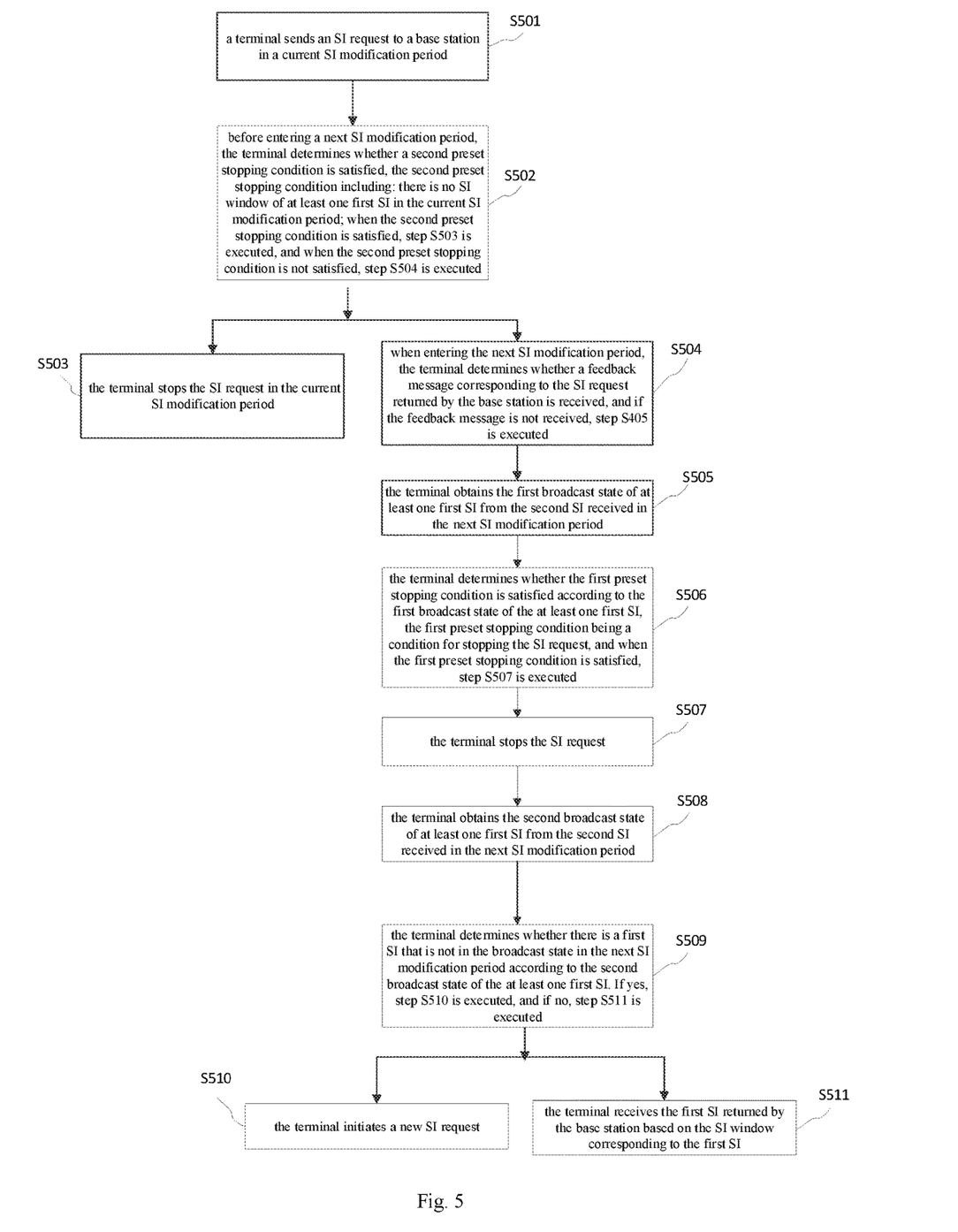
FIG. 5 is still yet another flow chart showing a method for processing the SI request according to an exemplary embodiment.

FIG. 5 is a flow chart showing a method for processing an SI request according to an exemplary embodiment. In the embodiment of the present disclosure, after the terminal sends the SI request to the base station in the current SI modification period, it can determine whether to stop the SI request according to whether there is an SI window of the first SI corresponding to the SI request in the current SI modification period. As shown in FIG. 5, the method for processing SI requests may include the following steps.

In step S501, a terminal sends an SI request to a base station in a current SI modification period.

This step is the same as step S401, and will not be repeated here.

In step S502, before entering a next SI modification period, the terminal determines whether a second preset stopping condition is satisfied, and the second preset stopping condition includes: there is no SI window of at least one first SI in the current SI modification period; when the second preset stopping condition is satisfied, step S503 is executed, and when the second preset stopping condition is not satisfied, step S504 is executed.

The second preset stopping condition also includes that the feedback message corresponding to the SI request returned by the base station is not received in the current SI modification period.

It should be noted that the terminal can first determine whether there is at least one SI window of the first SI in the current SI modification period, and then determine whether the feedback message corresponding to the SI request returned by the base station is received in the current SI modification period. It is also possible to first determine whether the feedback message corresponding to the SI request returned by the base station is received in the current SI modification period, and then determine whether there is an SI window of the at least one first SI in the current SI modification period. In the embodiment of the present disclosure, the sequence of determining whether there is the SI window of the at least one first SI in the current SI modification period and determining whether the feedback message corresponding to the SI request returned by the base station is received in the current SI modification period, there is no specific limitation.

In step S503, the terminal stops the SI request in the current SI modification period.

In step S504, when entering the next SI modification period, the terminal determines whether a feedback message corresponding to the SI request returned by the base station is received, and if the feedback message is not received, step S405 is executed.

When entering the next SI modification period, the step for the terminal to determine whether the base station returns a feedback message corresponding to the SI request is the same as step S402, and will not be repeated here.

In step S505, the terminal obtains the first broadcast state of at least one first SI from the second SI received in the next SI modification period.

This step is the same as step S403, and will not be repeated here.

In step S506, the terminal determines whether the first preset stopping condition is satisfied according to the first broadcast state of the at least one first SI. The first preset stopping condition is a condition for stopping the SI request. When the first preset stopping condition is satisfied, step S507 is executed.

This step is the same as step S404, and will not be repeated here.

In step S507, the terminal stops the SI request.

This step is the same as step S405, and will not be repeated here.

In step S508, the terminal obtains the second broadcast state of at least one first SI from the second SI received in the next SI modification period.

This step is the same as step S406, and will not be repeated here.

In step S509, the terminal determines whether there is a first SI that is not in the broadcast state in the next SI modification period according to the second broadcast state of the at least one first SI. If yes, step S510 is executed, and if no, step S511 is executed.

This step is the same as step S407, and will not be repeated here.

In step S510, the terminal initiates a new SI request.

This step is the same as step S408, and will not be repeated here.

In step S511: the terminal receives the first SI returned by the base station based on the SI window corresponding to the first SI.

This step is the same as step S408, and will not be repeated here.

In the embodiment of the present disclosure, before entering the next SI modification period, the terminal detects that there is no SI window in the current SI modification period, and stops the SI request in the current SI modification period, and the SI request is stopped in time, which avoids repeatedly sending SI requests that have been fed back and saves network resources.

Figure 6:
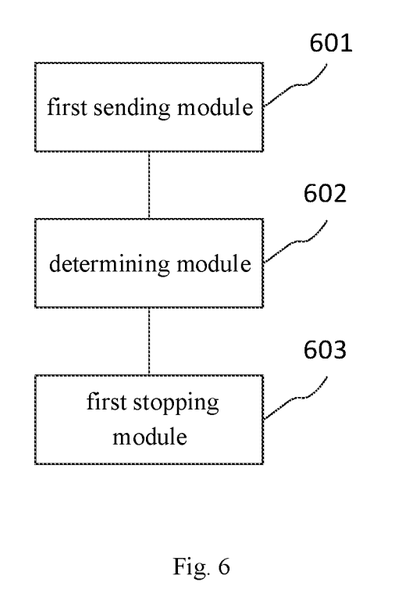
FIG. 6 is a block diagram showing a device for processing the SI request according to an exemplary embodiment.

FIG. 6 is a block diagram showing a device for processing an SI request according to an exemplary embodiment. For executing the steps executed by the terminal in the above method, as shown in FIG. 6, the device includes: a first sending module 601, configured to send an SI request to the base station in a current SI modification period, and the SI request is configured to obtain at least one first SI corresponding to the SI request; a first determining module 602, configured to determine whether a feedback message corresponding to the SI request returned by the base station is received in a next SI modification period; a first stopping module 603, configured to stop the SI request when the feedback message is not received.

In another possible implementation, the device further includes: a first judging module, configured to judge whether there is an SI window of the at least one first SI in the current SI modification period; a second stopping module, configured to stop the SI request in the current SI modification period when there is no SI window of the at least one first SI in the current SI modification period.

The first determining module 602 is further configured to, when there is the SI window of the at least one first SI in the current SI modification period, determine whether a feedback message corresponding to the SI request returned by the base station is received in the next SI modification period.

In another possible implementation, the device further includes: a first obtaining module, configured to obtain a first broadcast state of the at least one first SI in the second SI received in the next SI modification period; a second judging module, configured to judge whether the first preset stopping condition is satisfied according to the first broadcast state of the at least one first SI, where the first preset stopping condition is a condition for stopping the SI request. The first stopping module 603 is further configured to stop the SI request when the first preset stopping condition is satisfied.

In another possible implementation, the second judging module is further configured to determine whether each first SI corresponding to the SI request is in the broadcast state according to the first broadcast state of the at least one first SI; when each first SI corresponding to the SI request is in a broadcast state, determine that the first preset stopping condition is satisfied.

In another possible implementation, the second judging module is further configured to determine whether there is a first SI in the broadcast state among the at least one first SI corresponding to the SI request according to the first broadcast state of the at least one first SI; when there is a first SI in the broadcast state among the at least one first SI, determine that the first preset stopping condition is satisfied.

In another possible implementation, the device further includes: a receiving module, configured to, when the first preset stopping condition is satisfied, determine the first SI in the broadcast state based on the first broadcast state of the at least one first SI; receive the first SI in the broadcast state returned by the base station in the SI window corresponding to the first SI in the broadcast state.

In another possible implementation, the device further includes: a second obtaining module, configured to obtain a second broadcast state of the at least one first SI in the second SI received in the next SI modification period; a third judging module, configured to determine whether there is a first SI that is not in the broadcast state in the at least one first SI in the next SI modification period according to the second broadcast state of the at least one first SI; a second sending module, configured to, when there is a first SI that is not in the broadcast state, initiate a new SI request.

In another possible implementation, the device further includes: a first detection module, configured to detect whether the SI request is carried in the first message MSG1 in the random access procedure. The first stopping module 603 is configured to, when the SI request is carried in the MSG1, stop the SI request.

In another possible implementation, the device further includes: a second detection module, configured to detect whether the SI request is carried in the third message MSG3 in the random access procedure. The first stopping module 603 is configured to, when the SI request is carried in the MSG3, stop the SI request.

In the embodiment of the present disclosure, when the terminal enters the next SI modification period, the terminal determines whether the feedback message corresponding to the SI request returned by the base station is received. When the feedback message is not received, the first broadcast state of the first SI is received in the next SI modification period, and it is determined whether to stop the SI request according to the first broadcast state, which avoids repeated sending of the SI request that has been fed back, and saves network resources.

Figure 7:
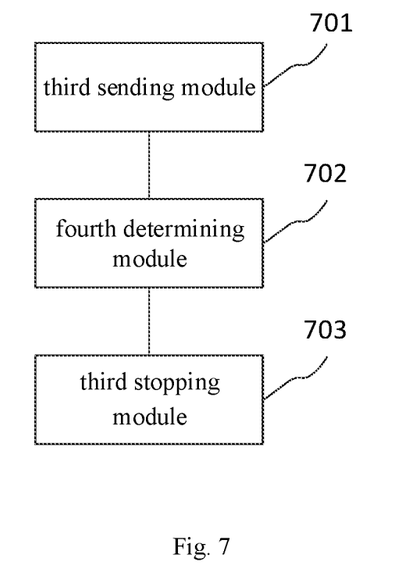
FIG. 7 is another block diagram showing a device for processing the SI request according to an exemplary embodiment.

FIG. 7 is a block diagram showing a device for processing an SI request according to an exemplary embodiment. For executing the steps executed by the terminal in the above method, as shown in FIG. 7, the device includes: a third sending module 701, configured to send an SI request to a base station in a current SI modification period, where the SI request is configured to obtain at least one first SI corresponding to the SI request; a fourth judging module 702, configured to determine whether a second preset stopping condition is satisfied before entering a next SI, and the second preset stopping condition includes that there is no SI window of the at least one first SI in the current SI modification period; and a third stopping module 703, configured to stop the SI request in the current SI modification period when the second preset stopping condition is satisfied.

In another possible implementation, the second preset stopping condition further includes that a feedback message corresponding to the SI request returned by the base station is not received in the current SI modification period.

In the embodiment of the present disclosure, before entering the next SI modification period, the terminal detects that there is no SI window in the current SI modification period, and stops the SI request in the current SI modification period, and stops the SI request in time, which avoids repeatedly sending SI requests that have been fed back and saves network resources.

It should be noted that when the device for processing SI requests provided in the above embodiments processes the SI request, the division of the above functional modules is used for illustration. In actual applications, the above functions can be achieved by different functional modules according to needs. That is, the internal structure of the device is divided into different functional modules to complete all or part of the functions described above. In addition, the device for processing an SI request and the method for processing an SI request provided in the foregoing embodiments belong to a same concept. The specific implementation is described in the method embodiment, which will not be repeated here.

Figure 8:
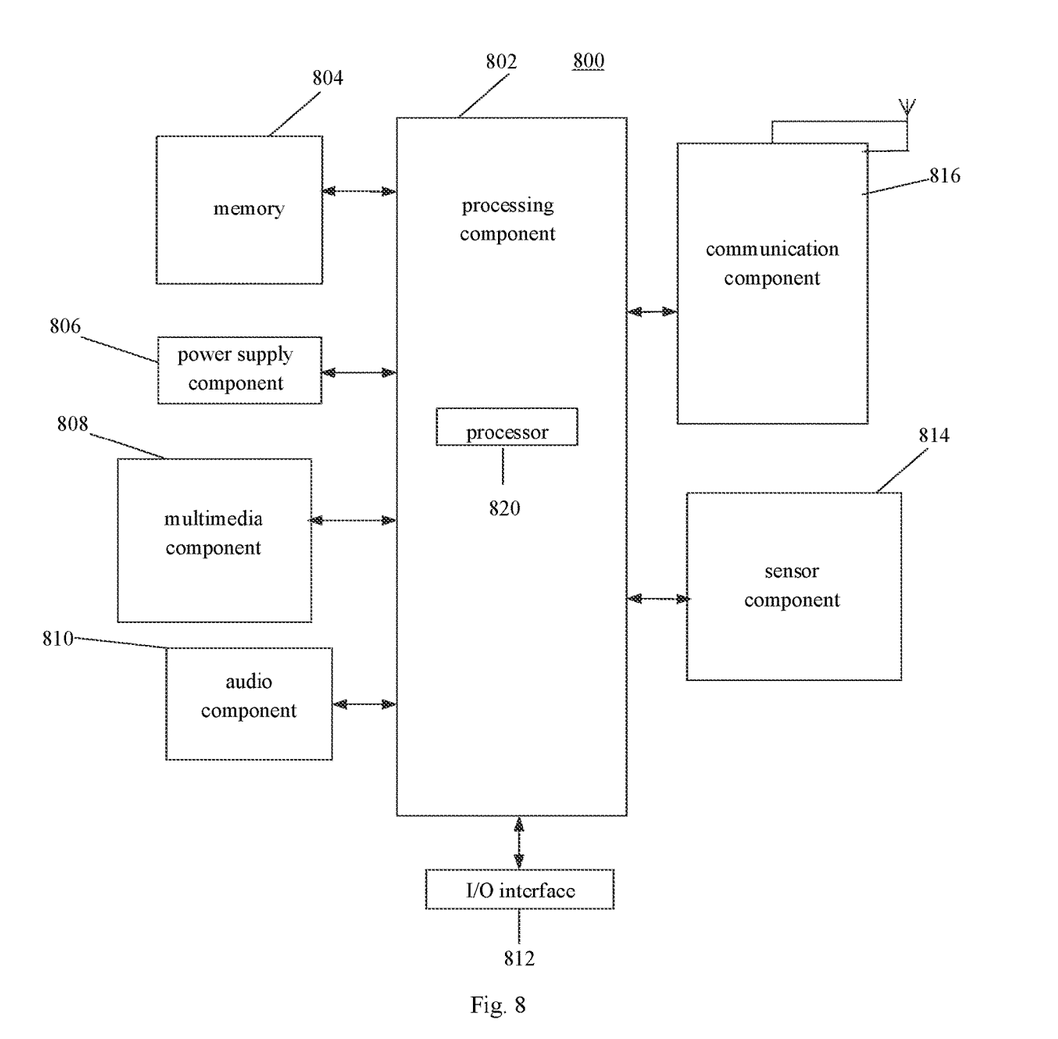
FIG. 8 is a block diagram showing a terminal according to an exemplary embodiment.

FIG. 8 is a block diagram showing a device 800 for processing SI requests according to an exemplary embodiment. For example, the device 800 may be a mobile phone, a computer, a digital broadcasting terminal, a message transmission device, a game console, a tablet device, a medical device, a fitness device, a personal digital assistant, etc.

Referring to FIG. 8, the device 800 may include one or more of the following components: a processing component 802, a memory 804, a power supply component 806, a multimedia component 808, an audio component 88, an input/output (I/O) interface 812, a sensor component 814, and a communication component 816.

The processing component 802 generally controls the overall operations of the device 800, such as operations associated with display, telephone calls, data communications, camera operations, and recording operations. The processing component 802 may include one or more processors 820 to execute instructions to implement all or part of the steps of the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800. Examples of such data include instructions for any application or method operating on the device 800, contact data, phone book data, messages, pictures, videos, etc. The memory 804 can be implemented by any type of volatile or non-volatile storage device or a combination thereof, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 806 provides power for various components of the device 800. The power supply component 806 may include a power management system, one or more power supplies, and other components for generating, managing, and distributing power for the device 800.

The multimedia component 808 includes a screen that provides an output interface between the device 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense a touch, a slide, and gestures on the touch panel. The touch sensor may not only sense the boundary of the touch or slide operation, but also detect the duration and pressure related to the touch or slide operation. In some embodiments, the multimedia component 808 includes a front camera and/or a rear camera. When the device 800 is in an operation mode, such as a shooting mode or a video mode, the front camera and/or the rear camera can receive external multimedia data. Each front camera and rear camera can be a fixed optical lens system or have focal length and optical zoom capabilities.

The audio component 810 is configured to output and/or input audio signals. For example, the audio component 810 includes a microphone (MIC). When the device 800 is in an operation mode, such as a call mode, a recording mode, and a voice recognition mode, the microphone is configured to receive external audio signals. The received audio signal may be further stored in the memory 804 or transmitted via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include, but are not limited to: a home button, a volume button, a start button, and a lock button.

The sensor component 814 includes one or more sensors for providing the device 800 with various aspects of state assessment. For example, the sensor component 814 can detect the ON/OFF state of the device 800 and the relative positioning of components, such as the display and keypad of the device 800. The sensor component 814 can also detect the position change of the device 800 or a component of the device 800, presence or absence of contact between the user and the device 800, the orientation or acceleration/deceleration of the device 800, and the temperature change of the device 800. The sensor component 814 may include a proximity sensor configured to detect the presence of an object nearby when there is no physical contact. The sensor component 814 may also include an optical sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the device 800 and other devices. The device 800 can access a wireless network based on a communication standard, such as WiFi, 2G or 3G; or a combination thereof. In an exemplary embodiment, the communication component 816 receives a broadcast signal or a broadcast related message from an external broadcast management system via a broadcast channel. In an exemplary embodiment, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 800 may be implemented by one or more application specific integrated circuits (ASIC), digital signal processors (DSP), digital signal processing devices (DSPD), programmable logic devices (PLD), field programmable gate array (FPGA), controller, microcontroller, microprocessor, or other electronic component, and is configured to implement the above-mentioned method for processing the SI request.

In an exemplary embodiment, there is also provided a non-transitory computer-readable storage medium including instructions, for example, the memory 604 including instructions, and the foregoing instructions may be executed by the processor 620 of the device 600 to implement the foregoing method. For example, the non-transitory computer-readable storage medium may be ROM, random access memory (RAM), CD-ROM, magnetic tape, floppy disk, optical data storage device, etc.

The embodiment of the present invention also provides a computer-readable storage medium. The computer-readable storage medium is applied to a terminal, and the computer-readable storage medium stores at least one instruction, at least one program, code set, or instruction set, and the instruction, the program, the code set, or the instruction set is loaded and executed by the processor to implement the operations performed by the terminal in the method for processing an SI request in the foregoing embodiment.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for processing a system information (SI) request, comprising:
   sending the SI request to a base station in a current SI modification period, wherein the SI request is configured to obtain at least one first SI corresponding to the SI request;
   when there is a SI window of the at least one first SI in the current SI modification period, determining whether a feedback message corresponding to the SI request returned by the base station is received in a next SI modification period;
   stopping retransmission of the SI request when no feedback message is received;
   obtaining a second broadcast state of the at least one first SI in a second SI received in the next SI modification period; and
   determining whether there is a first SI that is not in the broadcast state in the at least one first SI in the next SI modification period according to the second broadcast state of the at least one first SI;
   when there is the first SI that is not in the broadcast state, initiating a new SI request.

2. The method according to claim 1, wherein after sending the SI request to the base station in the current SI modification period and before entering the next SI modification period, the method further comprises:
   when there is no SI window of the at least one first SI in the current SI modification period, stopping the retransmission of the SI request in the current SI modification period.

3. The method according to claim 1, wherein before stopping the retransmission of the SI request, the method further comprises:
   obtaining a first broadcast state of the at least one first SI in the second SI received in the next SI modification period;
   determining whether a first preset stopping condition is satisfied according to the first broadcast state of the at least one first SI, where the first preset stopping condition is a condition for stopping the SI request;
   when the first preset stopping condition is satisfied, stopping the retransmission of the SI request.

4. The method according to claim 3, wherein the determining whether the first preset stopping condition is satisfied according to the first broadcast state of the at least one first SI comprises:
   determining whether each first SI corresponding to the SI request is in a broadcast state according to the first broadcast state of the at least one first SI;
   when each first SI corresponding to the SI request is in the broadcast state, determining that the first preset stopping condition is satisfied.

5. The method according to claim 3, wherein the determining whether the first preset stopping condition is satisfied according to the first broadcast state of the at least one first SI comprises:
   determining whether there is a first SI in a broadcast state in SIs corresponding to the SI request according to the first broadcast state of the at least one first SI;
   when there is the first SI in the broadcast state in the at least one first SI, determining that the first preset stopping condition is satisfied.

6. The method according to claim 3, further comprising:
   when the first preset stopping condition is satisfied, determining a first SI in a broadcast state based on the first broadcast state of the at least one first SI;
   receiving the first SI in the broadcast state returned by the base station in an SI window corresponding to the first SI in the broadcast state.

7. The method according to claim 1, wherein before stopping the retransmission of the SI request, the method further comprises:
   detecting whether the SI request is carried in a first message MSG1 in a random access procedure;
   when the SI request is carried in the MSG1, stopping the retransmission of the SI request.

8. The method according to claim 1, wherein before stopping the retransmission of the SI request, the method further comprises:
   detecting whether the SI request is carried in a third message MSG3 in a random access procedure;
   when the SI request is carried in the MSG3, stopping the retransmission of the SI request.

9. A method for processing an SI request, comprising:
   sending the SI request to a base station in a current SI modification period, wherein the SI request is configured to obtain at least one first SI corresponding to the SI request;
   before entering a next SI modification period, determining whether a second preset stopping condition is satisfied, wherein the second preset stopping condition includes that there is no SI window of the at least one first SI in the current SI modification period;
   when the second preset stopping condition is satisfied, stopping the retransmission of the SI request in the current SI modification period;
   obtaining a second broadcast state of the at least one first SI in a second SI received in the next SI modification period;
   determining whether there is a first SI that is not in the broadcast state in the at least one first SI in the next SI modification period according to the second broadcast state of the at least one first SI; and
   when there is the first SI that is not in the broadcast state, initiating a new SI request.

10. The method according claim 9, wherein the second preset stopping condition further comprises that a feedback message corresponding to the SI request returned by the base station is not received in the current SI modification period.

11. A terminal, comprising:
    a processor; and
    a memory configured to store instructions executable by the processor,
    wherein, the processor is configured to:
    send an SI request to a base station in a current SI modification period, wherein the SI request is configured to obtain at least one first SI corresponding to the SI request;
    when there is a SI window of the at least one first SI in the current SI modification period, determine whether a feedback message corresponding to the SI request returned by the base station is received in a next SI modification period;
    stop the retransmission of the SI request when no feedback message is received;
    obtain a second broadcast state of the at least one first SI in a second SI received in the next SI modification period;

determine whether there is a first SI that is not in the broadcast state in the at least one first SI in the next SI modification period according to the second broadcast state of the at least one first SI; and when there is the first SI that is not in the broadcast state, initiate a new SI request.

12. A terminal for implementing the method of claim 9, comprising:

a processor; and a memory configured to store instructions executable by the processor, wherein, the processor is configured to perform steps of the method.

13. The terminal according to claim 11, wherein after sending the SI request to the base station in the current SI modification period and before entering the next SI modification period, the processor is further configured to:

when there is no SI window of the at least one first SI in the current SI modification period, stop the retransmission of the SI request in the current SI modification period.

14. The terminal according to claim 11, wherein before stopping the retransmission of the SI request, the terminal is further configured to:

obtain a first broadcast state of the at least one first SI in a second SI received in the next SI modification period;

determine whether a first preset stopping condition is satisfied according to the first broadcast state of the at least one first SI, where the first preset stopping condition is a condition for stopping the retransmission of the SI request;

when the first preset stopping condition is satisfied, stop the retransmission of the SI request.

15. The terminal according to claim 14, wherein the processor is configured to:

determine whether each first SI corresponding to the SI request is in a broadcast state according to the first broadcast state of the at least one first SI;

when each first SI corresponding to the SI request is in the broadcast state, determine that the first preset stopping condition is satisfied.

16. The terminal according to claim 14, wherein the processor is configured to:

determine whether there is a first SI in a broadcast state in SIs corresponding to the SI request according to the first broadcast state of the at least one first SI;

when there is the first SI in the broadcast state in the at least one first SI, determine that the first preset stopping condition is satisfied.

17. The terminal according to claim 14, wherein the processor is further configured to:

when the first preset stopping condition is satisfied, determine a first SI in a broadcast state based on the first broadcast state of the at least one first SI;

receive the first SI in the broadcast state returned by the base station in an SI window corresponding to the first SI in the broadcast state.

18. The terminal according to claim 11, wherein before stopping the retransmission of the SI request, the processor is further configured to:

detect whether the SI request is carried in a first message MSG1 in a random access procedure;

when the SI request is carried in the MSG1, stop the retransmission of the SI request.

19. The terminal according to claim 11, wherein before stopping the retransmission of the SI request, the processor is further configured to:

detect whether the SI request is carried in a third message MSG3 in a random access procedure;

when the SI request is carried in the MSG3, stop the retransmission of the SI request.

* * * * *